Sept. 30, 1958 S. RICHARDS 2,854,237
CHUCKS FOR MACHINE TOOLS
Filed April 9, 1958 4 Sheets-Sheet 1

INVENTOR
STANLEY RICHARDS
BY Moses, Nolte + Nolte
Attorneys

Sept. 30, 1958     S. RICHARDS     2,854,237
CHUCKS FOR MACHINE TOOLS
Filed April 9, 1958     4 Sheets-Sheet 2

United States Patent Office 2,854,237
Patented Sept. 30, 1958

2,854,237

CHUCKS FOR MACHINE TOOLS

Stanley Richards, Springhill, Penn, Wolverhampton, England, assignor to Integral Limited, Wolverhampton, England, a British company Application April 9, 1958, Serial No. 727,330

4 Claims. (Cl. 279—4)

This invention relates to diaphragm chucks, i. e. to chucks including work-holding jaws mounted on a diaphragm which is fixed at its periphery. In such chucks the jaws are opened to receive a workpiece by applying pressure to the centre of the diaphragm and closed to grip the workpiece when the distorting pressure is removed.

High pressure is required to distort the diaphragm sufficiently to open the jaws and the object of the invention is to provide a construction in which the operating force is reduced.

The chuck according to the invention comprises a body portion, work-holding jaws mounted on a diaphragm which is fixed at its periphery to the body portion, a second diaphragm also fixed at its periphery to the body portion and mounted behind the work-holding diaphragm, a plunger extending forwardly from the second diaphragm for actuating the work-holding diaphragm to open the jaws, and at least one operating piston of small area movably mounted in the body portion behind the second diaphragm, and operable to impart forward movement to the second diaphragm through the intermediary of liquid trapped between itself and the second diaphragm.

By stating that the operating piston or pistons is or are of small area it is meant that their area is small in comparison with that of the second diaphragm. Accordingly, on application of operating pressure to the piston or pistons a magnified hydrostatic pressure is applied to the second diaphragm, causing its plunger to deflect the work-holding diaphragm to open the jaws thereon.

Two embodiments of diaphragm chuck according to the invention will now be described in detail, by way of example, with reference to the accompanying drawings, in which.

Like reference numerals indicate like parts throughout the figures.

Figure 1:
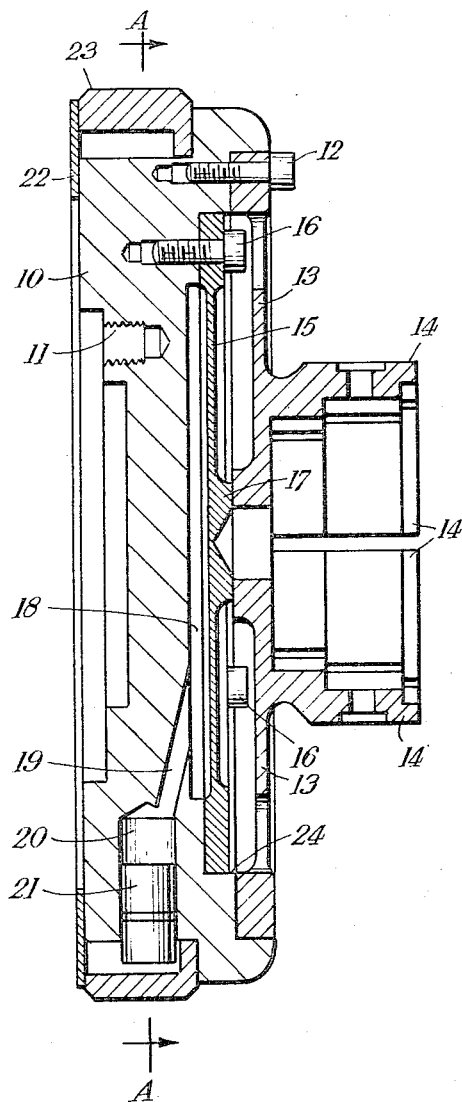
Fig. 1 is a vertical section showing the first form of chuck.
Figure 2:
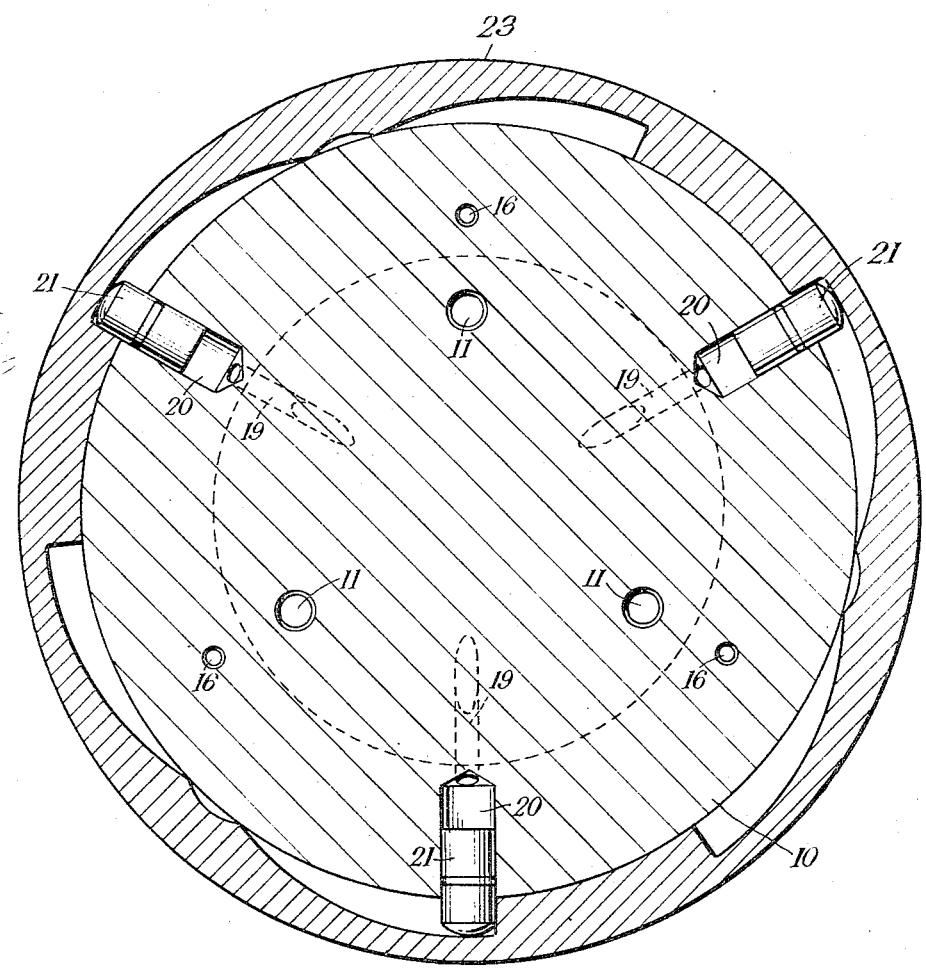
Fig. 2 is a section on the line A—A in Fig. 1.

The construction of Figs. 1 and 2 will now be described.

The body 10 of the chuck has in its rear face three tapped holes 11 for the reception of screws for attaching it, by means of an adaptor, to the spindle of a machine tool. Attached to the front of the body 10 by screws 12 is a diaphragm 13 carrying near its centre six forwardly projecting work-holding jaws 14. To the base of a cup-shaped recess 24 in the front of the body is attached, by screws 16, an inner diaphragm 15, carrying a forwardly projecting plunger 17 which coacts with the rear face of the work-holding diaphragm 13. A chamber 18, disposed in the body immediately to the rear of the diaphragm 15, has three extensions 19 communicating with radial bores 20, each of which contains a piston 21. The chamber 18, extensions 19 and bores 20 are filled with liquid. Mounted on the exterior of the body 11 and held in position by a retaining plate 22 is a knurled cam ring 23 which coacts with the outer ends of the pistons 21. When the cam ring 23 is rotated anti-clockwise, as seen in Fig. 2, it forces the pistons 21 inwardly, thereby applying a magnified hydrostatic pressure to the diaphragm 15 and causing its plunger 17 to deflect the diaphragm 13 to open the jaws 14. After insertion of a workpiece into the jaws 14, the ring 23 is turned back to the position shown, whereupon the jaws 14 will contract to grip the work firmly.

Figure 3:
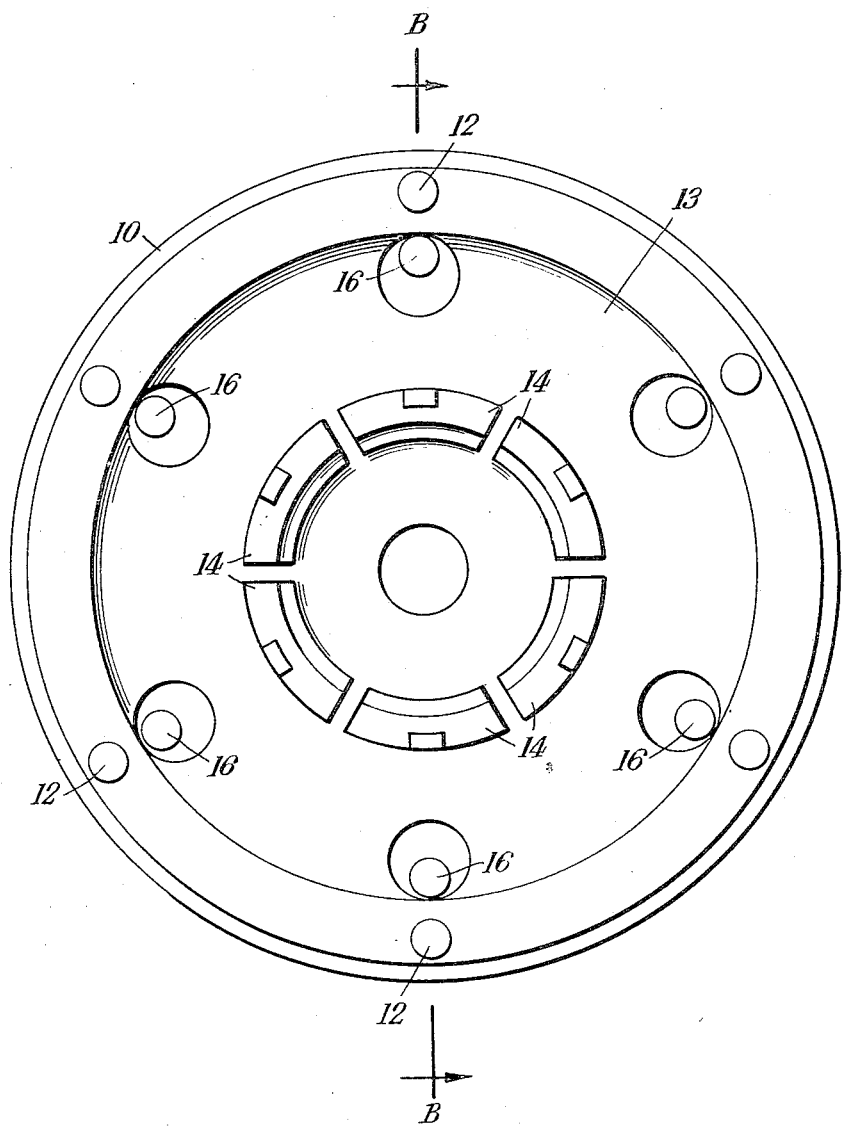
Fig. 3 is an end elevation of the second form of chuck.
Figure 4:
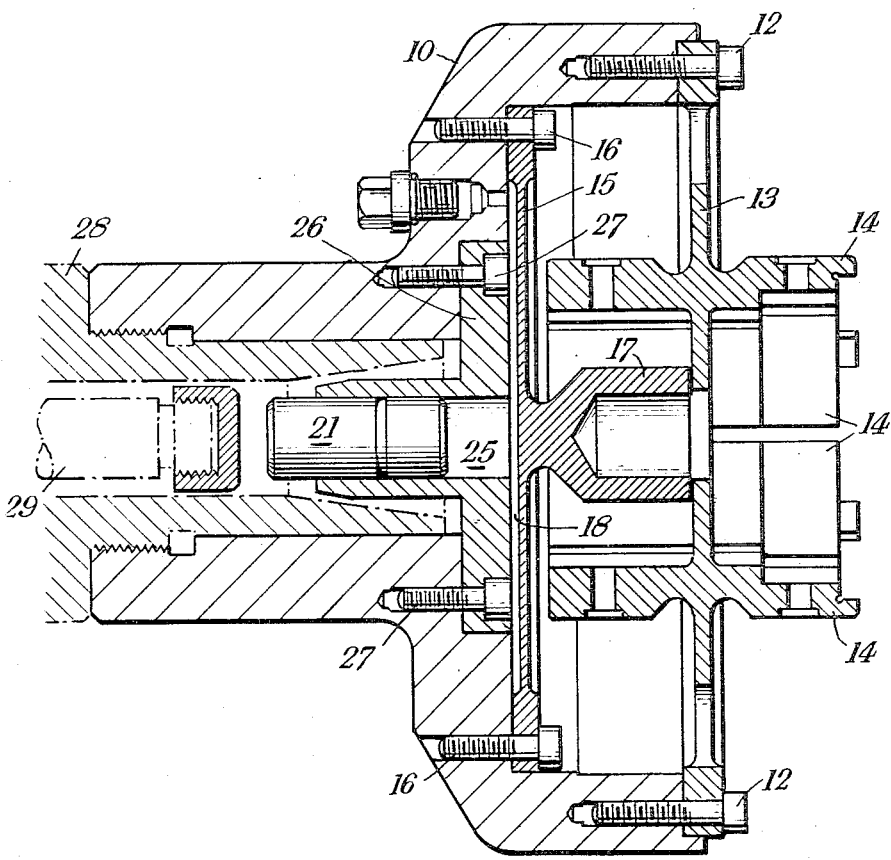
Fig. 4 is a section on the line B—B in Fig. 3.

In the construction shown in Figs. 3 and 4 a single piston 21 only is provided. This is slidable in a bore 25 in a sleeve 26 attached by screws 27 to the body 10. It is movable axially towards the diaphragm 15 to impart movement thereto through the agency of liquid trapped in the bore 25 and the chamber 18. As will be seen from Fig. 4 the body 10 of the chuck is screwed to the hollow spindle 28 of a machine tool and within this spindle is mounted an actuating rod 29 which can be moved forward, by remote control or otherwise, to press the piston 21 towards the diaphragm 15. The magnified hydrostatic pressure thereby applied to the diaphragm 15 causes the plunger 17 to deflect the diaphragm 13 carrying the work-holding jaws 14. Finger pressure on the actuating rod 29 is sufficient to open the jaws 14 to their full stroke of .015" and the chuck is fully capable of holding components for internal grinding.

Each of the forms of the chuck shown in the drawings is dead concentric, is sensitive and is easily set to the light holding pressure required on thin walled components. Once set, the holding pressure is consistent. Variation in holding pressure is obtained by substituting for the work-holding diaphragm 13 another having jaws arranged in a ring of different diameter.

What I claim as my invention and desire to secure by Letters Patent is:

1. A chuck comprising a body portion, work-holding jaws mounted on a diaphragm which is fixed at its periphery to the body portion, a second diaphragm also fixed at its periphery to the body portion and mounted behind the work-holding diaphragm, a plunger extending forwardly from the second diaphragm for actuating the work-holding diaphragm to open the jaws, and at least one operating piston of small area movably mounted in the body portion behind the second diaphragm, and operable to impart forward movement to the second diaphragm through the intermediary of liquid trapped between itself and the second diaphragm.

2. A chuck according to claim 1, comprising a single operating piston mounted within the body portion for axial movement towards and away from the second diaphragm.

3. A chuck according to claim 2 wherein the operating piston is actuable by an operating rod mounted within the spindle of a machine tool to which the chuck may be detachably secured.

4. A chuck according to claim 1 comprising a plurality of operating pistons extending radially in relation to the body portion and a cam ring rotatably mounted on the body portion and operable to apply inward movement to the operating pistons and thereby to apply hydrostatic pressure to the second diaphragm.

References Cited in the file of this patent

UNITED STATES PATENTS

| | | |
|---|---|---|
| 2,553,178 | Day | May 15, 1951 |
| 2,565,430 | Hohwart et al. | Aug. 21, 1951 |